United States Patent [19]

Leach

[11] 4,139,224
[45] Feb. 13, 1979

[54] HOSE CLAMP FOR THIN WALL, HIGH PRESSURE FIRE HOSE

[75] Inventor: Paul A. Leach, Jaffrey, N.H.

[73] Assignee: Jaffrey Fire Protection Company, Inc., Jaffrey, N.H.

[21] Appl. No.: 815,187

[22] Filed: Jul. 13, 1977

[51] Int. Cl.² ............................................. F16L 33/04
[52] U.S. Cl. ....................................... 285/253; 24/284; 285/259
[58] Field of Search ............... 285/253, 259, 243, 242, 285/373, 419, 252, 256; 24/284, 279, 285, 286, 135 K

[56] References Cited

U.S. PATENT DOCUMENTS

| 1,286,388 | 12/1918 | Mulconvoy | 285/253 X |
| 1,731,320 | 10/1929 | Ratcliffe | 285/253 X |
| 1,913,030 | 6/1933 | Hux | 285/373 X |
| 2,562,116 | 7/1951 | Nelson | 285/259 X |
| 3,073,628 | 1/1963 | Cline et al. | 285/243 |
| 3,185,500 | 5/1965 | Luther | 285/256 X |
| 3,224,794 | 12/1965 | Crissy | 285/256 X |
| 3,495,855 | 2/1970 | Currie | 285/253 |
| 4,039,212 | 8/1977 | Skarud | 285/253 |

FOREIGN PATENT DOCUMENTS 1558575 1/1969 France ..................... 285/243

Primary Examiner—Thomas F. Callaghan
Attorney, Agent, or Firm—Pearson & Pearson

[57] ABSTRACT

A split, annular hose clamp for clamping one end of a length of thin wall, high pressure, fire hose on the nipple, or insert, of a hose coupling has relatively blunt, alternate ribs and grooves opposite to, fitting and mating with similar ribs and grooves on the nipple and has a pair of machine screws each extending across the butt joint of a pair of one-piece, substantially idential halves in which the heads are within the confines of the head recesses so that there are no sharp protuberances to cut fire hose. The screw heads are socketed for turning and the clamp is of less diameter than the coupling.

2 Claims, 2 Drawing Figures

HOSE CLAMP FOR THIN WALL, HIGH PRESSURE FIRE HOSE

BACKGROUND OF THE INVENTION

In the handling and storage of thin wall, high pressure, fire hose, which usually does not have any wire mesh reinforcing layer, it has been found that with ordinary hose couplings, the drawing of one length of hose over another may cause the sharp edges of the coupling or its bolts and nuts to cut and fracture the hose. Sometimes such hose is stored, or carried in stacks four or five lengths deep so that such dragging and cutting, in unloading the hose, causes considerable damage. On fire trucks, the length of such thin-walled hose may be one hundred feet or more, with one thousand feet of such lengths being carried and stacked on the truck. Thus, a sharp edge on one of the hose couplings can be dragged one hundred feet on the outside surface of another length to scratch it, or cut it, and cause a leak at the most disadvantageous time.

Exemplary of the type of hose couplings now in use and which have hose clamps on the nipples of the hose couplings which include either sharp pointed clamping ribs and grooves or protruding clamp flanges, bolt heads or nuts with sharp edges, or corners, are the following U.S. patents. U.S. Pat. No. 3,249,371, Peterman, May 3, 1966; U.S. Pat. No. 3,257,132, Lyons, Jun. 21, 1966; U.S. Pat. No. 3,432,190, Kunz, Mar. 11, 1969; U.S. Pat. No. 3,495,855, Currie, Feb. 17, 1970;

In each of these patents the split annular hose clamps are of greater diameter than the diameter of the clamp, there are projecting sharp edged attachment flanges protruding from the clamp halves and there are at least one pair, and sometimes two pairs of sharp cornered, hexagonal, bolt heads or nuts projecting beyond the flanges.

SUMMARY OF THIS INVENTION

In this invention, the spit annular clamp has relatively blunt alternate ribs and grooves on its inner face cooperable with opposite to, and mating with ribs and grooves on the outer face of the nipple of the hose coupling, so as not to cut or fracture, the thin wall, high pressure hose clamped therebetween.

The two one piece, substantially identical, complementary halves of the clamp are tightened by a pair of recessed machine screws so that the enlarged heads of the screws are wholly within the confines of the cylindrical outer surface of the clamp. Thus the outer surface is not only of less diameter than that of the coupling but it is free of any protuberances, sharp edges, sharp corners or other potential cutting or scratching elements.

There is thus no possibility that a coupling, or clamp of one length of hose can cut or scratch another such length, when dragged over it, in unloading succesive lengths from a fire truck.

DESCRIPTION OF A PREFERRED EMBODIMENT

Figure 1:
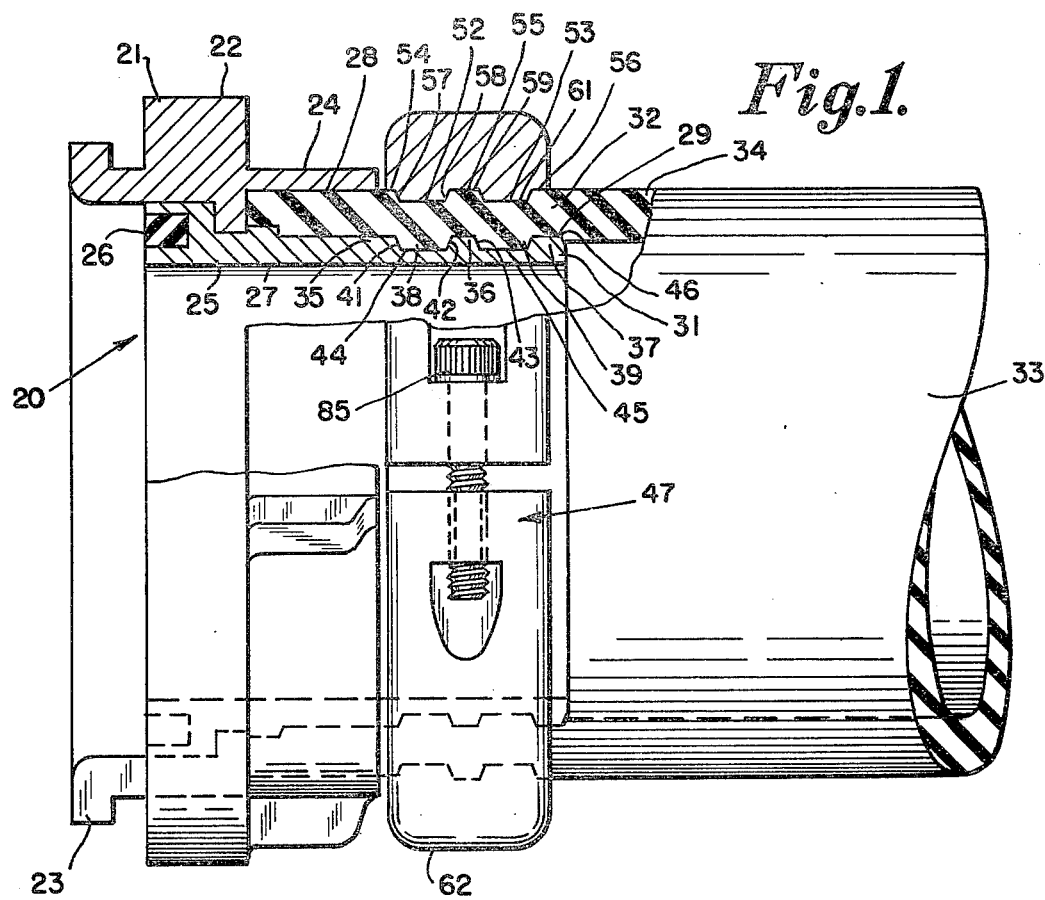
FIG. 1 is a side elevational view, partly in half section, showing a hose coupling, hose end and hose clamp constructed in accordance with the invention.
Figure 2:
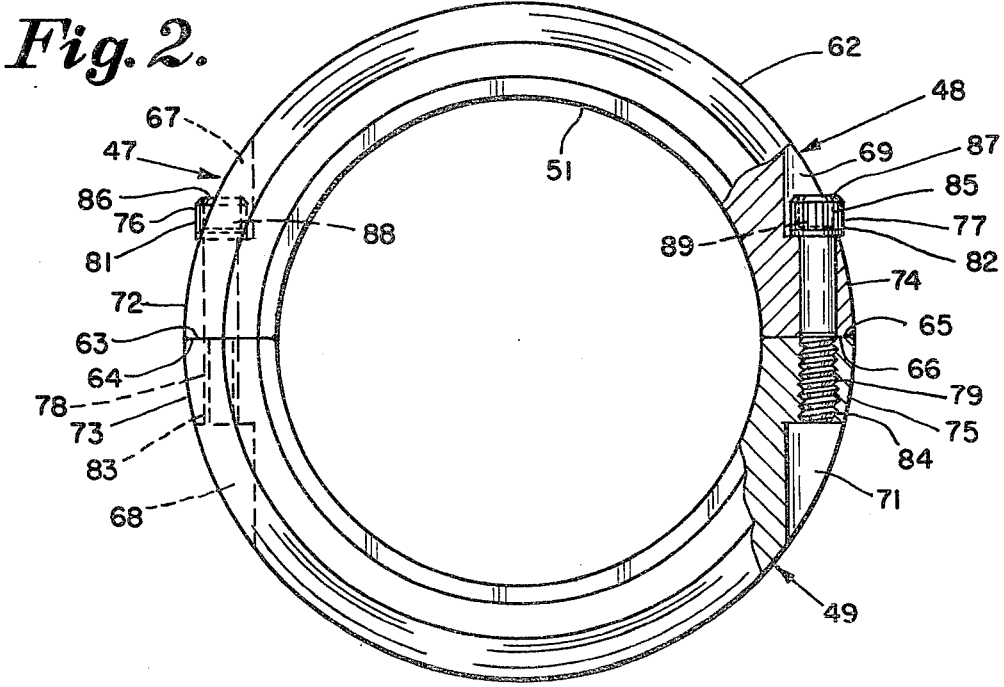
FIG. 2 is an end elevation of the split, smooth outer faced clamp of the invention with one side broken away to show the recessed, machine screw, connection at the joint.

As shown in the drawing, a fire hose coupling 20 for example, a Storz coupling well known in the tade includes the coupling member 21, of predetermined diameter and with a smooth outer, cylindrical surface 22. It als includes the integral latching hooks 23, annular, integral, axially-extending flange 24 and an axially-extending nipple, or insert 25, on which it is turnable. The elongated nipple 25 includes a resilient gasket 26, an interior cicumferential face 27 and an exterior circumferential face 28 and end surfaces 29 and 31.

The axially extending nipple 25 is insertable in one end 32 of a length 33 of high pressure fire hose having a thin wall 34, usually free of reinforcing mesh and capable of withstanding three hundred to six hundred pounds per square inch.

In this invention the exterior face 28 of the nipple 25 is provided with alternate, axially spaced ribs 35, 36 and 37 and grooves 38 and 39. The side walls such as 41, 42 and 43 of the ribs and grooves are tapered and the inner or outer walls such as 44, 45 and 46 are flat and cylindrical in configuration so that the spaced ribs and grooves are relatively blunt to distort the hose end 32 without puncture, fracture, cutting or other penetration.

The split, smooth outer walled, hose clamp 47 of the invention is of predetermined outer diameter less than the predetermined outer diameter of the coupling 21 and is of annular configuration, the clamp comprising a pair of substantially identical, complementary, one-piece, semi-annular halves 48 and 49.

Each one piece half 48, or 49 includes an interior circumferential face 51 provided with alternate, axially spaced ribs 52 and 53 and grooves 54, 55 and 56 which have tapered side walls 57 or 58 and flat circumferential walls 59 or 61 corresponding to those on the nipple surface 28 and also relatively blunt.

As shown in FIG. 1 the hose clamp 47 and nipple 25, when tightened have relatively blunt ribs and grooves, each rib in one being opposite to, mating with and fitting a groove in the other which distorts the distortable material of the end 32 of the high pressure hose length 33 to obtain a firm, mating grip without tending to damage or cut the hose to cause leakage.

The exterior face 62 of th clap 47 is smooth, generally cylindrical with rounded side edge at 50 and 60, and free of any protuberances and there are no outward projecting flanges at the butt, or joint ends 63 64, 65 and 66 of the identical halves 48 and 49.

Two pairs of screw head recesses 67, 68 and 69, 71 are provided in the exterior face 62 of the identical halves of the clamp, each being spaced from the adjacent but end 63, 64, 65 or 66 by a shelf-like, integral portion of the metal of the clamp such as at 72, 73, 74 and 75.

A pair of machine screws 76 and 77 each with a threaded shank 78 or 79 and an enlarged head 81 or 82 are threaded in threaded holes 83 and 84, each extending fo a recess, through a shelf portion to the adjacent butt end to register with the corresponding threaded hole in the opposite half.

Each enlarged head 81 or 82 is knurled as at 85 on the outside and includes an end face 86 or 87 with a socket 88 or 89 for receiving a turning instrument or tool by which it can be tightened or loosened.

It will be seen that the machine screws may be tightened from an endwise direction, rather than a side wise direction and that the entire machine screws are hidden within the confines of the clamp so as to present no sharp edges capable of dragging on and scratching, or cutting another length of hose.

We claim:

1. In combination with a fire hose coupling of the type having a predetermined outer diameter and an axially extending nipple insertable in one end of a length of thin walled, high pressure fire hose of distortable material:

a plurality of alternate, axially-spaced, annular, relatively-blunt, ribs and grooves, each having tapered side walls and flat cylindrical circumferential walls on the exterior face of said nipple;

and a split clamp having a smooth outer face of diameter less than the diameter of said coupling cooperable with the nipple of said coupling;

said clamp comprising a pair of substantially identical, semi-annular complementary one piece halves;

each said clamp half having alternate, axially-spaced, semi-annular, relatively-blunt, ribs and grooves, each having tapered side walls and flat, cylindrical, circumferential walls on the interior face thereof, which mate with the corresponding ribs and grooves on said nipple with each rib on one opposite, identically configured with, and fitting the groove on the other to distort and firmly clamp said hose end therebetween without fracture thereof;

each said clamp half having a smooth cylindrical exterior face, free of protuberances, with rounded side edges and each having a single central machine screw head recess in each opposite end, spaced from its joint face, and each having a threaded hole, for a machine screw, extending from each said recess to its adjacent joint face; and a single, central, pair of machine screws each having its head recessed in one of said head recesses and each threaded in the threaded holes at a joint to clamp said halves together in a radial direction around said hose end on said nipple.

2. A split, smooth outer faced clamp for use in clamping one end of a length of thin-walled, high-pressure fire hose of distortable material on the alternate, blunt ribbed and grooved surface of a nipple insert of a hose coupling said clamp comprising:

a pair of substantially identical, semi-annular complementary halves;

each said clamp half being one piece with integral axially spaced, relatively blunt ribs and grooves on the inner circumferential face thereof;

each said rib and groove in a clamp half being opposite to, identically configured with, mating with and fitting a corresponding rib or groove of said nipple insert, to distort and clamp said hose therebetween, each said rib and groove having a pair of tapered side walls separated by a flat, cylindrical, circumferential wall, each said clamp half having a smooth cylindrical outer circumferential face, free of protuberances with rounded side edges, but including a single, central pair of machine screw head recesses therein, each spaced from the adjacent butt end thereof and each having a registering threaded screw hole in the material of said half, extending from a said rcess to the adjacent butt end of the half, and a single, central pair of machine screws each having its head entirely within the confines of one of said screw head recesses and threaded in said registering bolt holes to clamp said halves together in a radial direction.

* * * * *